(12) United States Patent
Maier et al.

(10) Patent No.: US 8,129,473 B2
(45) Date of Patent: Mar. 6, 2012

(54) POLYPROPYLENE RESIN COMPOSITION

(75) Inventors: Ralph-Dieter Maier, Mason, OH (US); Vassilios Galiatsatos, Lebanon, OH (US); Dean Anthony Roessner, Loveland, OH (US); Susan Patricia Setty, Cincinnati, OH (US)

(73) Assignee: Lummus Novolen Technology GmbH, Mannheim (DE)

( * ) Notice: Subject to any disclaimer, the term of this patent is extended or adjusted under 35 U.S.C. 154(b) by 1260 days.

(21) Appl. No.: 10/555,474

(22) PCT Filed: May 10, 2004

(86) PCT No.: PCT/US2004/014652
§ 371 (c)(1),
(2), (4) Date: Oct. 2, 2006

(87) PCT Pub. No.: WO2004/101673
PCT Pub. Date: Nov. 25, 2004

(65) Prior Publication Data
US 2007/0161747 A1    Jul. 12, 2007

Related U.S. Application Data

(60) Provisional application No. 60/468,915, filed on May 8, 2003.

(51) Int. Cl.
*C08L 23/00* (2006.01)
*C08L 23/10* (2006.01)
(52) U.S. Cl. ........................... 525/240; 525/191
(58) Field of Classification Search .............. 525/191, 525/240
See application file for complete search history.

(56) References Cited

U.S. PATENT DOCUMENTS

| 4,822,840 A * | 4/1989 | Kioka et al. ............... 525/240 |
| 6,635,715 B1 | 10/2003 | Datta et al. |
| 2006/0167185 A1 * | 7/2006 | Fuchs et al. ............... 525/240 |

FOREIGN PATENT DOCUMENTS

| EP | 0 263 718 A2 | 4/1988 |
| EP | 0 483 523 A1 | 5/1992 |
| WO | 00/11076 A1 | 3/2000 |
| WO | WO-0232985 A1 * | 4/2002 |

OTHER PUBLICATIONS

First Office Action issued by the Intellectual Property Office of the People's Republic of China on Apr. 1, 2010 in corresponding Chinese Application No. 200910002323.3 (13 pages).
Decision of Refusal issued Jun. 14, 2011 in corresponding Japanese application No. 2006-532936 (with translation) (6 pages).
Decision on Rejection issued Jun. 23, 2011 in corresponding Chinese application No. 200910002323.3 (with translation) (9 pages).
First Office Action issued by the Japanese Patent Office on Aug. 17, 2010 in corresponding Japanese Application No. 2006-532936 (17 pages).
Third Office Action issued by the Intellectual Property Office of the People's Republic of China on Dec. 24, 2010 in corresponding Chinese Application No. 200910002323.3 (12 pages).

* cited by examiner

*Primary Examiner* — Irina S Zemel
*Assistant Examiner* — Jeffrey Lenihan
(74) *Attorney, Agent, or Firm* — Osha • Liang LLP

(57) ABSTRACT

A polymer blend includes a first random copolymer of propylene and one or more $C_2$-$C_{20}$ α-olefins other than propylene having a melting point of above 116° C. and up to about 145° C. and which constitutes from about 60 weight percent to about 95 weight percent of the composition, and a second random copolymer of propylene and one or more $C_2$-$C_{20}$ α-olefins other than propylene having a melting point of from about 70° C. to no more than 116° C. and which constitutes from about 5 weight percent to about 40 weight percent of the composition. The polymer blend includes a xylene soluble fraction having a weight average molecular weight of above about 100 kg/mol and an intrinsic viscosity of above about 1.0 dl/g.

30 Claims, No Drawings

POLYPROPYLENE RESIN COMPOSITION

CROSS-REFERENCE TO RELATED APPLICATIONS

The present application claims priority to U.S. Provisional application Ser. No. 60/468,915 filed May 8, 2003, and which is herein incorporated by reference.

BACKGROUND

1. Field of the Invention

The present invention relates to polypropylene resin compositions, and particularly to polypropylene resin compositions suited for heat sealing applications.

2. Background of the Art

Polypropylene ("PP") films are widely used as packaging materials, especially for food. Coating, laminating or coextruding a substrate film with a film made of a heat-sealable resin yields a heat sealable film. Materials traditionally used in heat sealing applications are isotactic random copolymers of propylene with at least one more $C_2$-$C_{20}$-α-olefin other than propylene, made by using Ziegler/Natta based ("ZN") catalysts. In order to simplify the description, random copolymers of propylene and ethylene will be referred to as $C_3/C_2$ random copolymers, random copolymers of propylene and 1-butene will be referred to as $C_3/C_4$ random copolymers, and random copolymers of propylene, ethylene and 1-butene will be referred to as $C_3/C_2/C_4$ random copolymers.

Random copolymers of propylene and one second higher α-olefin other than ethylene will be referred to as $C_3/C_x$-$C_y$ random copolymers where x indicates the minimum amount of carbon atoms said second higher α-olefin can be comprised of, and y indicates the maximum amount of carbon atoms said second higher α-olefin can be comprised of. For example, the term $C_3/C_4$-$C_8$ random copolymers comprises $C_3/C_4$ random copolymers, $C_3/C_5$ random copolymers, $C_3/C_6$ random copolymers, $C_3/C_7$ random copolymers and $C_3/C_8$ random copolymers. Random copolymers of propylene, ethylene and one third higher α-olefin will be referred to as $C_3/C_2/C_x$-$C_y$ random copolymers where x indicates the minimum amount of carbon atoms said third higher α-olefin can be comprised of, and y indicates the maximum amount of carbon atoms said third higher α-olefin can be comprised of. For example, the term $_3/C_2/C_4$-$C_6$ random copolymers comprises $C_3/C_2/C_4$ random copolymers, $C_3/C_2/C_5$ random copolymers and $C_3/C_2/C_6$ random copolymers.

In order to fulfill its function as a good heat-sealing agent, a resin should have a low seal initiation temperature ("SIT"). Also, as much material as possible should remain unmelted at higher temperatures in order to ensure dimensional integrity of the sealing layer on the substrate layer during processing. Furthermore, the presence of low molecular weight, amorphous material soluble in or extractable by organic solvents such as xylene and hexane, respectively, should not be too high in order to prevent contamination of food. Furthermore, the melt flow rate (MFR) of a sealing layer composition must not exceed a critical value. Otherwise, it cannot be processed to a film or a layer in a bi- or multi-layer film. Finally, the stiffness of a sealing layer composition, usually expressed in terms of the E-modulus, should be as high as possible in order to provide the film with mechanical strength.

Typical sealing-layer grades are $C_3/C_2$, $C_3/C_4$ and $C_3/C_2/C_4$ random copolymers. A low SIT is related to large amounts of the sealing layer material melting at temperatures as low as possible, but above room temperature. In $C_3/C_2$, $C_3/C_4$ and $C_3/C_2/C_4$ random copolymers, a low SIT is achieved by lowering the melting point through the introduction of comonomers into the PP backbone. In order to retain crystallinity at typical film processing temperatures, a portion as large as possible must remain unmelted at temperatures as high as possible. As known in the art, the mutually exclusive requirements of low SIT and large amounts of unmelted material at high temperatures can only be optimized by producing blends of two or more random copolymers. Typically, one component has a relatively high melting point and a relatively high degree of crystallinity whereas the other component has a lower melting point, a lower degree of crystallinity and a relatively high level of unwanted solubles/extractables. These solubles/extractables are of an amorphous consistency and of low molecular weight. Typically, the component with the higher melting point is a $C_3/C_2$, $C_3/C_4$ or a $C_3/C_2/C_4$ random copolymer and the component with the lower melting point is either a $C_3/C_2$, $C_3/C_4$ or a $C_3/C_2/C_4$ random copolymer with the exception that blends of two different $C_3/C_2$ random copolymers, that is where the first $C_3/C_2$ random copolymer exhibits a higher melting point and the second $C_3/C_2$ random copolymer exhibits a lower melting point, are typically not used because $C_3/C_2$ random copolymers contain higher levels of solubles/extractables compared to $C_3/C_4$ or $C_3/C_2/C_4$ random copolymers and the use of two components with relatively high levels of solubles/extractables would lead to compositions with exorbitantly high levels of solubles/extractables.

EP 263 718-B1 relates to a low-crystalline propylene random copolymer compositions comprising blends of $C_3/C_2$/$C_4$-$C_{20}$ and $C_3/C_4$-$C_{20}$ copolymers. The levels of xylene solubles and n-hexane extractables of these compositions need improvement.

EP 483 523-B1 relates to compositions based on crystalline propylene copolymers comprising blends of $C_3/C_4$-$C_8$ and $C_3/C_2/C_4$-$C_8$ random copolymers or blends of $C_3/C_4$-$C_8$ and $C_3/C_2$ random copolymers. The balance of the level of extractables, particularly hexane extractables, and the SIT of these compositions is not satisfactory. Furthermore, the compositions with low SIT need amounts of ≧35% of low crystallinity fraction. This limits large-scale production of such compositions to specialty processes as described in EP 483 523-B1 and in [P. Giusti, L. Lazzeri, N. Barbani, L. Lelli, S. DePetris, M. G. Cascone, Macromol. Symp. 78, 285-297 (1994)].

EP 560 326-B1 relates to semicrystalline polyolefin compositions comprising blends of $C_3/C_4$-$C_{10}$ and $C_3/C_4$-$C_{10}$ random copolymers. The balance between SIT and the level of solubles as well as the haze of these compositions need improvement. Furthermore, the compositions with low SIT need amounts of ≧35% of low crystallinity fraction. This limits large-scale production of such compositions to specialty processes as described above.

EP 674 991-B1 relates to crystalline propylene polymer compositions comprising $C_3/C_2$ and $C_3/C_2/C_4$-$C_8$ random copolymers. The level of hexane extractables and the SIT of these compositions need improvement. Furthermore, the compositions with low SIT need amounts of ≧35% of low crystallinity fraction. This limits large-scale production of such compositions to specialty processes as described above.

EP 780 432-B1 relates to compositions based on propylene polymers comprising blends of $C_3/C_2/C_4$ and $C_3/C_2/C_4$ random copolymers or blends of $C_3/C_4$ and $C_3/C_2/C_4$ random copolymers. The balance between SIT and the level of hexane extractables of these compositions need improvement.

EP 881 239-B1 relates to $C_3/C_2/C_4$ random copolymers. These grades need improvement in SIT.

WO 98/58971 relates to film-making $C_3/C_2/C_4-C_8$ random copolymers. These random copolymers need an improvement in SIT.

WO 00/11076 relates to crystalline propylene copolymer compositions comprising blends of $C_3/C_2$ or $C_3/C_4-C_8$ or $C_3/C_2/C_4-C_8$ random copolymers with $C_3/C_4-C_8$ or $C_3/C_2/C_4-C_8$ random copolymers. These compositions need improvement in the level of extractables, especially in hexane extractables. Furthermore, the resins obtained from the polymerization process of WO00/11076 need to be peroxidically visbroken in order to lower the amount of extractables to the desired level. This makes the process for their production more expensive than processes that do not require a peroxidic visbreaking step.

WO 02/44251 relates to the use of polymer compositions comprised of $C_3/C_2/C_4-C_8$ random copolymers for the production of films. Since these compositions are aiming at films with an improved balance of mechanical properties, the SIT is not competitive with the SIT of low sealing compositions. Moreover, the balance between tensile modulus and level of solubles needs improvement.

While the vast majority of sealing layer compositions is based on ZN catalysts, some compositions have been described that are based on metallocene catalysts. In order to simplify the description, the terms "produced by using metallocene catalysts" or "based on metallocene catalysts" will in the following be represented by the term "metallocene based". For a good metallocene based sealing layer composition, the same principles apply as for a ZN based composition: the mutual exclusive requirements of low SIT and large amounts of unmelted material at high temperatures can only be optimized by producing blends of two or more random copolymers. It is known in the art that metallocene based copolymers contain lower levels of solubles than their ZN based analogs. Nonetheless, the introduction of amorphous, low molecular weight fractions into state-of-the-art metallocene based sealing layer compositions comprised of two or more components has been inevitable and is still too high with regard to food packaging applications.

In US application 2002/0176974-A1, heat-seal polymer films are disclosed comprising a layer of film formed from a metallocene based isotactic $C_3/C_2$ random copolymer. They need improvement in SIT.

In EP 982 328-B1, polypropylene resin compositions are disclosed comprising a polypropylene component and a $C_3/C_2$ random copolymer component. The main purpose of those compositions is their use as sealants in a broader sense, for example as heat-seal improving agents. However, they are unsuitable for acting as a stand-alone sealing-layer (as part of a bi- or multi-layer cast film or biaxially oriented film) because of their high MFR and high levels of extractables. Furthermore, such compositions contain from 50 to 99 wt % of the $C_3/C_2$ random copolymers. This limits large-scale production of such compositions to specialty processes as described above or in EP 982 328-B1.

An objective of the invention is to eliminate the disadvantages of the state-of-the-art and make polypropylene resin compositions available that are suited for heat-sealing applications and that have, at comparable SIT, lower levels of hexane extractables than state-of-the-art polypropylene compositions or that have, at comparable levels of hexane extractables, lower SITs than state-of-the-art polypropylene compositions or that have a combination of lower SIT and lower levels of extractables than state-of-the-art polypropylene compositions.

The objective of the invention is achieved by polypropylene compositions that exhibit xylene soluble fractions with very high molecular weight, and by polypropylene compositions that comprise ultra-low crystallinity fractions, and also by a process for preparing the polypropylene compositions.

SUMMARY

A polypropylene resin composition is provided which is particularly suited for heat sealing applications. It comprises blends of random copolymers of propylene with one or more non-propylene α-olefins having from 2 to 20 carbon atoms where the first blend component accounts for 95-60 wt % of the composition and has a melting point that is higher than the melting point of the second blend component which accounts for 5% to 40 wt % of the composition.

At same or lower levels of hexane extractables, the SIT of the composition of the invention is up to 10° C. lower than the SIT of state-of-the-art single-reactor sealing layer grades made by using a gas phase vertically stirred reactor. This makes the present invention exhibit the best balance of SIT and level of hexane extractables compared to prior art. Moreover, despite the low SIT, films or film layers manufactured from the composition of the present invention exhibit excellent mechanical properties, in particular a high stiffness.

The composition of the invention provides a better balance of SIT, level of solubles and mechanical properties compared to prior art. Furthermore, only up to 40 wt % of the lower crystallinity material has to be produced in a second polymerization reactor or step. On top of that, the amount of comonomer that has to be incorporated into the low crystallinity fraction of the composition is significantly lower than in prior art of comparable SIT. This is a significant improvement for the vertically stirred gas phase process where production of compositions with properties of the invention was not possible yet. A further significant advantage is the nature of the solubles: whereas in prior art the solubles were of low molar mass, the solubles of the invention are high molecular weight. This means that at relatively high levels of xylene solubles, the food relevant FDA hexane extractables are extraordinary low. Another advantage of the present invention is the fact that its compositions comprise ultra low crystallinity fractions not present in prior art compositions. These ultra low crystallinity compositions provide excellent heat-sealing behavior.

Compared to EP 263 718-B1, the levels of xylene solubles and hexane extractables of the compositions of the present invention are lower. Compared to the compositions disclosed in EP 483 523-B1, the levels of hexane extractables of the compositions of the present invention are lower. Furthermore, whereas in the compositions of EP 483 523-B1 between 35 and 70 wt % of low crystallinity component are required, in the compositions of the present invention the amount of low melting material is between only 5 and 40 wt %. The amount of low crystallinity material required in the composition of the present invention is less compared to EP 560 326-B1 and EP 674 991-B1 where between 40 and 80 wt % of low crystallinity material are required. Furthermore, compared to the compositions of EP 560 326-B1, the balance between the SIT and the level of extractables is better in the present invention, and compared to EP 674 991-B1, the levels of extractables and the SITs are lower in the compositions of the present invention. Compared to WO 00/11076, where between 20 and 80 wt % of the low crystalline component need to be present and, where in addition a peroxidic degradation step has to be employed in order to yield low extractables and SIT values, in the compositions of the present invention the amount of low melting material is maximum 40 wt % and no peroxidic degradation step is required. This facilitates the production of the composition of the present invention tremendously. Furthermore, the compositions of the present invention exhibit lower levels of extractables than the compositions disclosed in WO 00/11076. Compared to EP 780 432-B1, the amount of comonomer that has to be incorporated into the random copolymer produced in the first reactor is significantly lower in the present invention. Thus, production problems like reactor fouling are much less likely. Furthermore, in the compositions of the present invention, the SIT values are significantly lower at same or lower amount of solubles. Compared to random copolymers disclosed in EP 881 239-B1 and WO98/58971, the SIT of the present invention is significantly lower at same or lower level of extractables. Compared to WO 02/44251, SIT and level of extractables are much lower in the present invention, at similar film stiffness. Compared to EP 982 328-B1, the compositions provided in the present invention can be used as the sole component of a sealing layer in a mono-, bi- or multi-layer cast or biaxially oriented film due to their low-enough MFR and lower levels of extractables.

DETAILED DESCRIPTION OF PREFERRED EMBODIMENT(S)

The invention relates to copolymer compositions of propylene random copolymers with at least one more $C_2$-$C_{20}$-$\alpha$-olefin other than propylene which is particularly suited, inter alia, for the manufacture of films or film layers using any film-making process, particularly processes for making cast film and biaxially oriented film. The films or film layers of the present invention exhibit very low proportion of extractables, very low seal initiation temperature, and a good balance of stiffness, toughness and transparency. Polymer films used for packaging and wrapping (particularly in the food industry) are generally multilayered having, for example, a polypropylene (homopolymer or copolymer) layer and at least one sealing layer. The blend of polypropylene copolymers disclosed herein is advantageously employed as a sealing layer for such films. For the purpose of the present invention, non-propylene $C_2$-$C_{20}$-$\alpha$-olefins are ethylene or linear or branched $\alpha$-olefins that have from 4 to 20 carbon atoms. Preference is given to ethylene and linear $\alpha$-olefins. Particular, but non-limiting examples are ethylene, 1-butene, 1-pentene, 1-hexene, 4-methyl-1-pentene and 1-octene. The copolymer composition consists of from about 60 weight percent to about 95 weight percent of a first random copolymer of propylene and at least one non-propylene $C_2$-$C_{20}$-$\alpha$-olefin and of about 5 weight percent to about 40 weight percent of a second random copolymer of propylene and at least one non-propylene $C_2$-$C_{20}$-$\alpha$-olefin.

It is usual for customary amounts of conventional additives, such as stabilizers, lubricants, mold-release agents, fillers, nucleating agents, antistats, plasticizers, dyes, pigments or flame retardants to be added to the polypropylene composition prior to its use. These are usually incorporated into the polymer during pelletization of the polymerization product produced in pulverulent form. The usual stabilizers are antioxidants, such as sterically hindered phenols, process stabilizers, such as phosphites or phosphonites, acid scavengers, such as calcium stearate, zinc stearate or dihydrotalcite, sterically hindered amines, or else UV stabilizers. The novel polypropylene composition generally comprises amounts of up to 2% by weight of one or more of the stabilizers. Examples of suitable lubricants and mold-release agents are fatty acids, the calcium or zinc salts of the fatty acids, fatty amides and low-molecular-weight polyolefin waxes, and these are usually used in concentrations of up to 2% by weight. Examples of suitable nucleating agents are inorganic additives, such as talc, silica or kaolin, salts of mono- or polycarboxylic acids, such as sodium benzoate, aluminum tert-butylbenzoate or disodium norbornanedicarboxylate, dibenzylidenesorbitol or its $C_1$-$C_8$-alkyl-substituted derivatives, such as bis(p-methyl-benzylidene)sorbitol) or bis(3,4-dimethylbenzylidene)sorbitol, salts of diesters of phosphoric acid, such as sodium 2,2'-methylenebis(4,6-di-t-ert-butylphenyl) phosphate, amides of dicarboxylic acids, such as N,N'-dicyclohexylnaphthalinedicarboxamide, and rosin based nucleating agents. The content of nucleating agents in the propylene polymer composition is generally up to 5% by weight. Additives of this type are generally commercially available and are described, for example, in Zweifel (Ed.), Plastics Additives Handbook, 5th Edition, Hansa Publishers, Munich, 2000.

One embodiment of the invention relates to copolymer compositions of propylene random copolymers with at least one more $C_2$-$C_{20}$-$\alpha$-olefin other than propylene. The first random copolymer is characterized in that its propylene content is from above 90 to about 99.5 weight percent and in that it contains at least one more $C_2$-$C_{20}$-$\alpha$-olefin. Preferred $C_2$-$C_{20}$-$\alpha$-olefins are ethylene, 1-butene, 1-pentene, 1-hexene, 4-methyl-1-pentene and 1-octene. Particularly preferred $C_2$-$C_{20}$-$\alpha$-olefins are ethylene and 1-butene. Preferred first random copolymers are $C_3/C_4$ random copolymers, $C_3/C_2$ random copolymers and $C_3/C_2/C_4$ random copolymers, and particularly preferred first random copolymers are $C_3/C_2$ random copolymers. The first random copolymer is furthermore characterized in that its melting point is from above 116° C. and up to about 145° C., and in that its MFR is from above 2 g/10 min to about 12 g/10 min. The first random copolymer is furthermore characterized in that it is produced by means of a metallocene catalyst.

The second random copolymer is characterized in that its propylene content is from above 85 to about 97 weight percent and in that it contains at least one more $C_2$-$C_{20}$-$\alpha$-olefin, and in that the propylene content of the second random copolymer is always lower than the propylene content of the first random copolymer. Preferred $C_2$-$C_{20}$-$\alpha$-olefins are ethylene, 1-butene, 1-pentene, 1-hexene, 4-methyl-1-pentene and 1-octene. Particularly preferred $C_2$-$C_{20}$-$\alpha$-olefins are ethylene and 1-butene. Preferred second random copolymers are $C_3/C_4$ random copolymers, $C_3/C_2$ random copolymers and $C_3/C_2/C_4$ random copolymers, and particularly preferred second random copolymers are $C_3/C_2$ random copolymers. The second random copolymer is furthermore characterized in that it has a melting point of from about 70° C. to no more than 116° C. The second random copolymer is furthermore characterized in that it has a melting enthalpy from about 10 J/g to no more than 75 J/g, said melting enthalpy arising from the melting of crystals of polypropylene random copolymers. The second random copolymer is furthermore characterized in that its MFR is from above 2 g/10 min to about 12 g/10 min. The second random copolymer is furthermore characterized in that it is produced by means of a metallocene catalyst.

The composition may contain a fraction soluble in xylene at 20° C. If present, the xylene soluble fraction is characterized in that its molecular weight is larger than 100 kg/mol and its intrinsic viscosity is larger than 1.0 dl/g. Preferably, the molecular weight of the compositions xylene soluble fraction is larger than 150 kg/mol, and its intrinsic viscosity is larger than 1.3 dl/g. More preferably, the molecular weight of the compositions xylene soluble fraction is larger than 200 kg/mol, and its intrinsic viscosity is larger than 1.6 dl/g. Most preferably, the molecular weight of the compositions xylene soluble fraction is larger than 300 kg/mol, and its intrinsic viscosity is larger than 2.0 dl/g. The composition is furthermore characterized in that it contains from 3 to 30 weight percent of ultra low crystallinity fractions, said ultra low crystallinity fractions being defined as the difference between the amount of xylene soluble components as determined at 20° C. and 2 hours settling time and the amount of xylene soluble components as determined at 20° C. and 5 days settling time. The composition is furthermore characterized in that its MFR is from above 2 g/10 min to about 12 g/10 min.

A second embodiment of the invention relates to copolymer compositions of $C_3/C_2$ random copolymers which is particularly suited, among other things, for the manufacture of films or film layers having very low SIT, high crystallinity and very low amount of FDA hexane extractables. The first $C_3/C_2$ random copolymer is characterized in that its propylene content is from above 90 to about 99.5 weight percent. The first $C_3/C_2$ random copolymer is furthermore characterized in that its melting point is from above 116° C. and up to about 145° C., and in that its melt flow rate (MFR 230/2.16) is from above 2 g/10 min to about 12 g/10 min. The first $C_3/C_2$ random copolymer is furthermore characterized in that it is produced by means of a metallocene catalyst.

The second $C_3/C_2$ random copolymer is characterized in that its propylene content is from above 85 to about 97 weight percent and in that the propylene content of the second random copolymer is always lower than the propylene content of the first random copolymer. The second $C_3/C_2$ random copolymer is furthermore characterized in that it has a melting point of from about 70° C. to no more than 116° C. The second random copolymer is furthermore characterized in that it has a melting enthalpy from about 10 J/g to no more than 75 J/g, said melting enthalpy arising from the melting of crystals of polypropylene random copolymers. The second $C_3/C_2$ random copolymer is furthermore characterized in that its MFR is from above 2 g/10 min to about 12 g/10 min. The second $C_3/C_2$ random copolymer is furthermore characterized in that it is produced by means of a metallocene catalyst.

The composition may contain a fraction soluble in xylene at 20° C. If present, the xylene soluble fraction is characterized in that its molecular weight is larger than 100 kg/mol and its intrinsic viscosity is larger than 1.0 dl/g. Preferably, the molecular weight of the compositions xylene soluble fraction is larger than 150 kg/mol, and its intrinsic viscosity is larger than 1.3 dl/g. More preferably, the molecular weight of the compositions xylene soluble fraction is larger than 200 kg/mol, and its intrinsic viscosity is larger than 1.6 dl/g. Most preferably, the molecular weight of the compositions xylene soluble fraction is larger than 300 kg/mol, and its intrinsic viscosity is larger than 2.0 dl/g. The composition is furthermore characterized in that its MFR is from above 2 g/10 min to about 12 g/10 min. The composition is furthermore characterized in that it contains from 3 to 30 weight percent of ultra low crystallinity fractions, said ultra low crystallinity fractions being defined as the difference between the amount of xylene soluble components as determined at 20° C. and 2 hours settling time and the amount of xylene soluble components as determined at 20° C. and 5 days settling time. The composition is furthermore characterized in that the total $C_2$ content of the composition lies between 0 wt % and 7 wt %.

Yet another embodiment of the present invention embodiment of the invention relates to polypropylene compositions, as characterized by either a combination of xylene solubles determination at 20° C. and 5 days settling time and preparative temperature rising elution fractionation (TREF) carried out in steps between 40° C. and 107° C. with xylene as the solvent, or by preparative temperature rising elution fractionation (TREF) carried out in steps between 20° C. and 107° C. with xylene as the solvent. The composition can be broken down into a fraction soluble in xylene, a low crystallinity fraction, an intermediate crystallinity fraction, a high crystallinity fraction and a very high crystallinity fraction. If the first fraction in the TREF procedure is being taken at 40° C. (without having prior taken a fraction at 20° C.), this fraction contains both the xylene soluble fraction and part of the low crystallizing fraction. However, it is desirable to distinguish between the xylene soluble fraction and low crystallizing fraction, which is comprised of all material eluted up to 50° C. minus the xylene soluble fraction. Thus, the fraction soluble in xylene has to be determined in a separate experiment by the standard procedure of determining the amount of xylene solubles at 20° C. and 5 days settling time. If the first fraction in the TREF procedure is being taken at 20° C., the fraction soluble in xylene is just the fraction eluted by TREF at 20° C.

Again, if the first fraction in the TREF procedure is being taken at 40° C., the low crystallinity fraction is being determined as the difference between the amount of material eluted by TREF up to 50° C. and the xylene solubles at 20° C. and 5 days settling time. If the first fraction in the TREF procedure is being taken at 20° C., the low crystallinity fraction is just the amount of material eluted by TREF at temperatures from 21 up to 50° C. The intermediate crystallinity fraction is being determined as the amount of material eluted by TREF from 51 to 60° C. The high crystallinity fraction is being determined as the amount of material eluted by TREF from 61 to 92° C. The very high crystallinity material is being determined as the amount of material eluted by TREF at temperatures above 92° C.

The composition is comprised of from 0 to 10 weight percent, preferably from 0 to 5 weight percent of the fraction soluble in xylene, from 10 to 50 weight percent, preferably from 15 to 45 weight percent of the low crystallinity fraction, from 0 to 20 weight percent, preferably from 0 to 10 weight percent of the intermediate crystallinity fraction, from 20 to 70 weight percent, preferably from 30 to 60 weight percent of the high crystallinity fraction, and from 0 to 5 weight percent of the very high crystallinity fraction. The composition is furthermore characterized in that the amount of material being eluted between 51° C. and 60° C. is by at least 5 weight percent, referred to the total amount of material in the composition, smaller than the amount of material that is being eluted between 40° C. and 50° C. and by at least 40 weight percent smaller than the amount of material that is being eluted between 61° C. and 92° C. The composition is furthermore characterized in that it contains from 3 to 30 weight percent of ultra low crystallinity fractions, said ultra low crystallinity fractions being defined as the difference between the amount of xylene soluble components as determined at 20° C. and 2 hours settling time and the amount of xylene soluble components as determined at 20° C. and 5 days settling time.

Another embodiment of the present invention relates to polypropylene compositions comprising a high crystallinity component and a low crystallinity component characterized by the amount of the low crystallinity component nucleated by the high crystallinity component, expressed both by:
  (I) the difference between
    (a) the amount of xylene solubles proportionally calculated from the xylene solubles individually determined for the two blend components according to the blend ratio and
    (b) the amount of xylene solubles actually measured in the blend, and
  (II) by the ratio of said difference to the amount (Ia) of xylene solubles proportionally calculated from the two blend components according to the blend ratio.

Yet another embodiment of the present invention of the invention relates to a process for the polymerization of the compositions of the present invention. For the purposes of the present invention, the term "polymerization" refers to both homopolymerization and copolymerization.

The polymerization is carried out in the presence of a metallocene catalyst. For the purposes of the present invention, metallocene catalysts are any of the catalyst systems which comprise at least one metallocene compound (A), and metallocenes compounds (A) here are any of the complex compounds of metals of transition groups of the Periodic Table with organic ligands. Metallocene catalysts comprise furthermore a metallocenium-ion-forming compound (B), and, if desired, a passivated support, and, if desired, at least one further additive component (C). Suitable catalysts for the polymerization of the compositions of the present invention are described in US 2003/0149199-A1. As metallocene compounds (A) of the catalyst system of the present invention, use is made of at least one compound of the formula I below,

where the substituents have the following meanings:

$M^1$ is a metal of Group IVb of the Periodic Table of the Elements, preferably $M^1$ is zirconium or hafnium, and more preferably $M^1$ is zirconium, $L^1$ and $L^2$ are identical or different and are each a substituted mononuclear or polynuclear hydrocarbon radical or (a) hetero atom(s) containing hydrocarbon radical(s), for example substituted cyclopentadienyl, indenyl, tetrahydroindenyl, azurenyl, fluorenyl, azapentalenyl, thiapentalenyl or oxapentalenyl, which can form a sandwich structure with the central atom $M^1$, preferably, $L^1$ is a substituted cyclopentadienyl, indenyl, tetrahydroindenyl, azurenyl, fluorenyl, azapentalenyl, thiapentalenyl or oxapentalenyl, which can form a sandwich structure with the central atom $M^1$, and $L^2$ is a substituted indenyl, tetrahydroindenyl, azurenyl, fluorenyl, azapentalenyl, thiapentalenyl or oxapentalenyl, which can form a sandwich structure with the central atom $M^1$, more preferably, $L^1$ and $L^2$ are identical or different and are each a substituted indenyl, azurenyl, fluorenyl, azapentalenyl, thiapentalenyl or oxapentalenyl, which can form a sandwich structure with the central atom $M^1$, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, or $R^1$ and $R^2$ together can form one or more ring system(s), preferably, $R^1$ and $R^2$ are identical or different and are an alkyl group of from 1 to about 10 carbon atoms, an alkoxy group of from 1 to about 10 carbon atoms, an aryloxy group of from 6 to 10 carbon atoms or a halogen atom, or $R^1$ and $R^2$ together may form one or more ring system(s), more preferably, $R^1$ and $R^2$ are identical or different and are methyl, chlorine or phenolate.

$R^9$ is a bridge between the ligands $L^1$ and $L^2$,

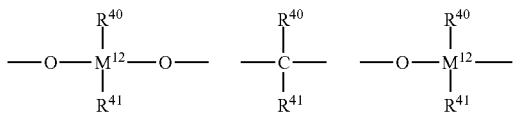

-continued

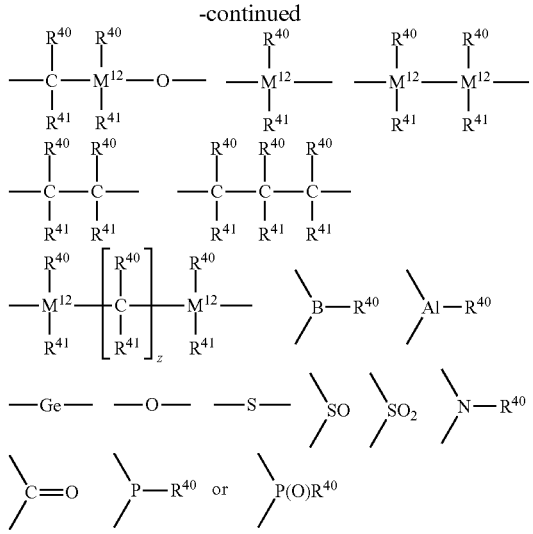

$R^{40}$, $R^{41}$ can be identical or different, even when they have the same index, and are each a hydrogen atom, a halogen atom or a $C_1$-$C_{40}$ group such as a $C_1$-$C_{20}$-alkyl group, a $C_1$-$C_{10}$-fluoroalkyl group, a $C_1$-$C_{10}$-alkoxy group, a $C_6$-$C_{14}$-aryl group, a $C_6$-$C_{10}$-fluoroaryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group or a $C_8$-$C_{40}$-arylalkenyl group, where $R^{40}$ and $R^{41}$ may each, together with the atoms connecting them, form one or more rings, and z is an integer from zero to 18, $M^{12}$ is silicon, germanium or tin, and $R^9$ may also link two units of the formula II to one another, preferably, the bridging unit $R^9$ is $R^{40}R^{41}Si=$, $R^{40}R^{41}Ge=$, $R^{40}R^{41}C=$ or $—(R^{40}R^{41}C—CR^{40}R^{41})—$, where $R^{40}$ and $R^{41}$ are identical or different and are each hydrogen or a $C_1$-$C_{20}$-hydrocarbon group, in particular $C_1$-$C_{10}$-alkyl or $C_6$-$C_{14}$-aryl, more preferably, $R^9$ is $R^{40}R^{41}Si=$, $R^{40}R^{41}C=$ or $—(R^{40}R^{41}C—CR^{40}R^{41})—$, where $R^{40}$ and $R^{41}$ are identical or different and are each phenyl or methyl.

More preferred, a metallocene compound (A) of the catalyst system used for the polymerization of the composition of the present invention, use is made of at least one compound of the formula II below

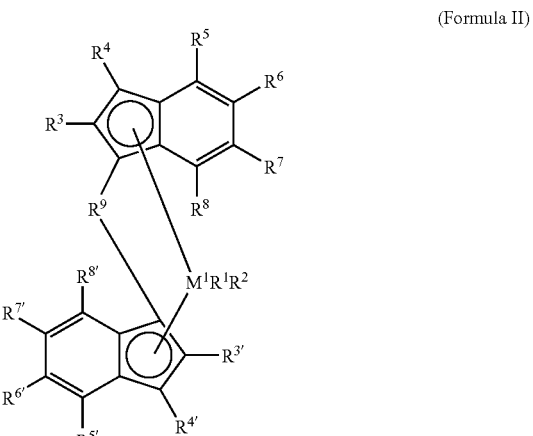

where the substituents and indices have the following meanings:

$M^1$ is a metal of Group IVb of the Periodic Table of the Elements, preferably $M^1$ is zirconium or hafnium, and more preferably $M^1$ is zirconium, $R^1$, $R^2$, and the bridging unit $R^9$ have the meaning set forth above with respect to formula I.

$R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or a arylalkenyl group of from 8 to about 40 carbon atoms, a substituted or unsubstituted alkylsilyl or arylsilyl group. The hydrocarbon groups may contain one or more hetero atoms like Si, B, Al, O, S, N or P, and/or may contain halogen atoms like F, Cl or Br and/or two adjacent radicals $R^5$, $R^6$ or $R^{5'}$, $R^{6'}$, or $R^6$, $R^7$ or $R^{6'}$, $R^{7'}$, or $R^7$, $R^8$ or $R^{7'}$, $R^{8'}$ in each case may form a hydrocarbon ring system or $R^5$ and $R^{5'}$ are identical or different and are each a substituted or unsubstituted aryl group of from 6 to about 40 carbon atoms.

More preferably, $R^4$, $R^5$ $R^6$, $R^7$, $R^8$ and also $R^{4'}$, $R^{5'}$, $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or a substituted or unsubstituted aryl group of from 6 to about 40 carbon atoms, which may contain one or more hetero atoms like Si, B, Al, O, S, N or P, and/or may contain halogen atoms like F, Cl or Br, and/or the two adjacent radicals $R^5$, $R^6$ and $R^{5'}$, $R^{6'}$ may form a hydrocarbon ring system or $R^5$ and $R^{5'}$ are identical or different and are each a substituted or unsubstituted aryl group of from 6 to about 40 carbon atoms.

Most preferably, $R^4$ and also $R^{4'}$ are hydrogen, $R^5$, $R^6$, $R^7$, $R^8$ and also $R^{5'}$, $R^{6'}$, $R^{7'}$, $R^{8'}$ are identical or different and are each a hydrogen atom or a linear, cyclic or branched alkyl group of from 1 to about 10 carbon atoms, or a substituted or unsubstituted aryl group of from 6 to about 40 carbon atoms and/or the two adjacent radicals $R^5$, $R^6$ and $R^{5'}$, $R^{6'}$ respectively together may form a ring system or $R^5$, $R^6$ may form a ring system and $R^{5'}$ is a substituted or unsubstituted aryl group of from 6 to 40 carbon atoms, such as phenyl, p-isopropyl-phenyl, p-tert-butyl-phenyl, p-sec-butyl-phenyl, p-cyclohexyl-phenyl, p-trimethylsilyl-phenyl, p-adamantyl-phenyl, p-(CF$_3$)-phenyl, m,m'-dimethyl-phenyl, naphthyl, or $R^{5'}$, $R^{6'}$ may form a ring system and $R^5$ is a substituted or unsubstituted aryl group of from 6 to 40 carbon atoms, such as phenyl, p-isopropyl-phenyl, p-tert-butyl-phenyl, p-sec-butyl-phenyl, cyclohexyl-phenyl, p-trimethylsilyl-phenyl, p-adamantyl-phenyl, p-(CF$_3$)-phenyl, m,m'-dimethyl-phenyl, naphthyl, or $R^5$ and $R^{5'}$ are identical or different and are each a substituted or unsubstituted aryl group of from 6 to 40 carbon atoms, such as phenyl, p-isopropyl-phenyl, p-tert-butyl-phenyl, p-sec-butyl-phenyl, p-cyclohexyl-phenyl p-trimethylsilyl-phenyl, p-adamantyl-phenyl, p-(CF$_3$)-phenyl, m,m'-dimethyl-phenyl, naphthyl.

$R^3$ is a hydrocarbon group, not cyclic or branched in the α-position, for example an alkyl group of from 1 to about 20 carbon atoms, an aryl substituted alkyl group of from 7 to about 40 carbon atoms, or an aryl substituted alkenyl group of from 8 to about 40 carbon atoms. The hydrocarbon groups may contain one or more hetero atoms like Si, B, Al, O, S, N or P, and/or may contain halogen atoms like F, Cl or Br, $R^{3'}$ is in an α-position cyclic or branched group, for example an alkyl group of from 3 to about 20 carbon atoms, an alkenyl group of from 3 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms. The groups may contain one or more hetero atoms like Si, B, Al, O, S, N or P, and/or may contain halogen atoms like F, Cl or Br.

Preferably, $R^3$ is a linear alkyl group of from 1 to about 10 carbon atoms or an alkenyl group of from 2 to about 10 carbon atoms, which can be halogenated, $R^{3'}$ is an in α-position cyclic or branched alkyl group of from 3 to about 20 carbon atoms, an alkenyl group of from 3 to about 20 carbon atoms, or an alkylaryl group of from 7 to about 20 carbon atoms.

More preferably, $R^3$ is methyl, ethyl, n-propyl, n-butyl, n-pentyl or n-hexyl, and $R^{3'}$ is iso-propyl, iso-butyl, n-butyl, sec-butyl, cyclobutyl, 1-methyl-butyl, 1-ethyl-butyl, 1-methyl-pentyl, cyclopentyl, cyclohexyl, cyclopent-2-enyl, cyclopent-3-enyl, cyclohex-2-enyl, cyclohex-3-enyl or p-methyl-cyclohexyl.

Not limiting examples for the particularly preferred metallocene compounds of the present invention are the following compounds:

dimethylsilandiyl(2-methyl-4-(para-tert-butyl-phenyl)-indenyl) (2-isopropyl-4-(para-tert-butyl-phenyl)-indenyl)zirconiumdichloride, dimethylsilandiyl(2-ethyl-4-(4'-tert-butyl-phenyl)-indenyl) (2-isopropyl-4-(4'-tert-butyl-phenyl)-indenyl)zirconium-dichloride, dimethylsilandiyl(2-methyl-4-(4'-tert.butyl-phenyl)-indenyl)(2-isopropyl-4-phenyl-indenyl)zirconiumdichloride, dimethylsilandiyl(2-methyl-4-phenyl)-1-indenyl)(2-isopropyl-4-(4'-tert.-butyl-phenyl)-1-indenyl)zirconiumdichloride, dimethylsilandiyl(2-ethyl-4-(4'-tert.butyl-phenyl)-indenyl) (2-isopropyl-4-phenyl)-indenyl)zirconiumdichloride, dimethylsilandiyl(2-isopropyl-4-(4'-tert.butyl-phenyl)-indenyl)(2-methyl-4,5-benzo-indenyl)zirconiumdichloride, dimethylsilandiyl(2-methyl-4-(4'-tert.butyl-phenyl)-indenyl)(2-isopropyl-4-(1-naphtyl)-indenyl)zirconiumdichloride, dimethylsilandiyl(2-isopropyl-4-(4'-tert.butyl-phenyl)-indenyl)(2-methyl 4-(1-naphtyl)-indenyl)zirconiumdichloride.

The catalysts also comprises at least one metallocenium-ion-forming compound B as the cocatalyst.

Examples of suitable metallocenium-ion-forming compound (B) are strong neutral Lewis acids, ionic compounds with Lewis-acid cations and ionic compounds with Bronsted acids as cations.

Preferred strong neutral Lewis acids are compounds of the general formula (III)

$$M^2X^1X^2X^3 \tag{III}$$

where $M^2$ is an element of the 3rd main group of the Periodic Table, in particular B, Al or Ga, preferably B, and $X^1$, $X^2$ and $X^3$ are hydrogen, $C_1$-$C_{10}$-alkyl, $C_6$-$C_{15}$-aryl, alkylaryl, arylalkyl, haloalkyl or haloaryl with in each case from 1 to 10 carbon atoms in the alkyl radical and from 6 to 20 carbon atoms in the aryl radical or fluorine, chlorine, bromine or iodine, in particular haloaryl, preferably pentafluorophenyl.

preference is given to compounds of the general formula (III), in which $X^1$, $X^2$ and $X^3$ are identical, preferably tris (pentafluorophenyl)borane.

Suitable ionic compounds with Lewis-acid cations are compounds of the general formula (IV):

$$[(Y^{a+})Q_1Q_2 \ldots Q_z]^{d+} \tag{IV}$$

where

Y is an element of the 1st to 6th main group or of the 1st to 8th subgroup of the Periodic Table, $Q_1$ to $Q_z$ are radicals with a single negative charge, such as $C_1$-$C_{28}$-alkyl, $C_6$-$C_{15}$-aryl, alkylaryl, arylalkyl, haloalkyl, haloaryl with in each case from 6 to 20 carbon atoms in the aryl radical and from 1 to 28 carbon atoms in the alkyl radical, $C_3$-$C_{10}$-cycloalkyl, which may be unsubstituted or substituted with $C_1$-$C_{10}$-alkyl groups, or are halogen, $C_1$-$C_{28}$-alkoxy, $C_6$-$C_{15}$-aryloxy, silyl or mercaptyl, a is an integer from 1 to 6, z is an integer from 0 to 5, and d is the difference a-z, and is greater than or equal to 1.

Particularly suitable cations are carbonium cations, oxonium cations and sulfonium cations, and also cationic transition metal complexes. The triphenylmethyl cation, the silver cation and the 1,1'-dimethylferrocenyl cation should be mentioned in particular. They preferably have non-coordinating counterions, in particular boron compounds, as also mentioned in WO 91/09882, preferably tetrakis(pentafluorophenyl) borate.

Ionic compounds with Bronsted acids as cations and preferably likewise non-coordinating counterions are mentioned in WO 91/09882, and preferred cations are N,N-dimethylanilinium and N,N-dimethylcyclohexylammonium.

The amount of strong neutral Lewis acids, of ionic compounds with Lewis-acid cations or of ionic compounds with Bronsted acids as cations is preferably from 0.1 to 10 equivalents, based on the metallocene complex (A).

Particularly suitable metallocenium-ion-forming compounds (B) are open-chain or cyclic aluminoxane compounds of the general formulae (V) or (VI)

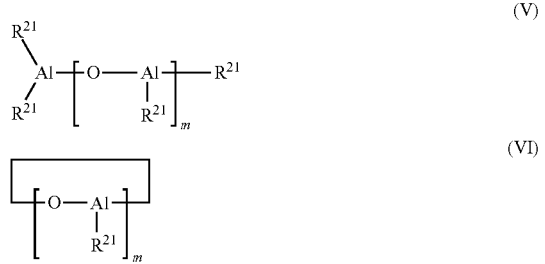

where $R^{21}$ is $C_1$-$C_{10}$-alkyl, preferably methyl or ethyl, and m is an integer from 5 to 30, preferably from 10 to 25.

These oligomeric aluminoxane compounds are generally prepared by reacting a solution of trialkylaluminum with water, as described, inter alia, in EP-A 284 708 and U.S. Pat. No. 4,794,096.

The oligomeric aluminoxane compounds thus obtained are generally mixtures of different linear and/or cyclic long-chain molecules, and m is therefore to be regarded as an average value. The aluminoxane compounds may also be present in a mixture with other metal alkyl compounds, preferably with alkylaluminum compounds.

It has proven advantageous to use amounts of the metallocene complexes A) and of the oligomeric aluminoxane compounds of the general formulae (V) or (VI) which give an atomic ratio of aluminum from the oligomeric aluminoxane compounds to transition metal from the metallocene complexes in the range from 10:1 to $10^6$:1, in particular from 10:1 to $10^4$:1.

It is moreover possible for the component B) used to be aryloxyaluminoxanes, as described in U.S. Pat. No. 5,391,793, aminoaluminoxanes, as described in U.S. Pat. No. 5,371,260, aminoaluminoxane hydrochlorides, as described in EP-A 633 264, siloxyaluminoxanes, as described in EP-A 621 279, or mixtures of these, instead of the aluminoxane compounds of the general formulae (V) or (VI).

Other suitable metallocenium-ion-forming compounds B) are the 40 boron-aluminium compounds disclosed in WO 99/06414, for example di[bis(penta-fluorophenylboroxy)] methylalane. The boron-aluminium compounds used may also have been deposited onto an organic or inorganic support.

The metallocene compound (A), and also the metallocenium-ion-forming compounds (B), can be used in solution, particular reference being given to aromatic hydrocarbons having from 6 to 20 carbon atoms, in particular xylenes and toluene.

Suitable metallocene catalysts may also comprise, as further component (C), a metallic compound of the general formula (VII)

where $M^3$ is an alkali metal, an alkaline-earth metal or a metal of the 3rd main group of the Periodic Table i.e. boron, aluminum, gallium, indium or thallium, $R^{22}$ is hydrogen, $C_1$-$C_{10}$-alkyl, $C_6$-$C_{15}$-aryl, alkylaryl or arylalkyl having in each case from 1 to 10 carbon atoms in the alkyl radical and from 6 to 20 carbon atoms in the aryl radical, $R^{23}$ and $R^{24}$ are hydrogen, halogen, $C_1$-$C_{10}$-alkyl, $C_6$-$C_{15}$-aryl, alkylaryl, arylalkyl or alkoxy having in each case from 1 to 10 carbon atoms in the alkyl radical and from 6 to 20 carbon atoms in the aryl radical, r is an integer from 1 to 3, and s and t are integers from 0 to 2, and the total r+s+t corresponds to the valence of $M^3$.

Among the metallic compounds of the general formula (VII), preference is given to those in which $M^3$ is lithium, magnesium or aluminum, and $R^{23}$ and $R^{24}$ are $C_1$-$C_{10}$-alkyl.

Particularly preferred metallic compounds of the formula (VII) are n-butyllithium, n-butyl-n-octylmagnesium, n-butyl-n-heptyl-magnesium, tri-n-hexylaluminum, tri-isobutylaluminum, triethyl-aluminum and trimethylaluminum.

If a metallic compound (C) is used, it is preferably present in the catalyst system in an amount which gives a molar ratio of $M^3$ from formula (VII) to transition metal $M^1$ from formula (II) of from 800:1 to 1:1, in particular from 500:1 to 50:1.

The metallocene complexes (A) may also be used on a support material.

The support materials used are preferably finely divided supports which generally have a particle diameter in the range from 1 to 300 μm, in particular from 20 to 90 μm. Examples of suitable support materials are inorganic oxides of silicon, of aluminum, of titanium, or of one of the metals of the 1st or 2nd main group of the Periodic Table or mixtures of these oxides, among which, besides alumina and magnesium oxide and phyllosilicates, preference is in particular given to silica gel.

The support may also be subjected to treatment with heat, e.g. to remove adsorbed water, and treatment of this type is usually carried out at from 80 to 200° C., preferably from 100 to 150° C., or the support may be calcined at temperatures up to 1000° C., preferably up to 600° C. The support may also be treated chemically, generally using conventional drying agents, such as metal alkyl compounds, preferably aluminum alkyl compounds, chlorosilanes or $SiCl_4$.

Other suitable supports are fine-particle polyolefins, such as fine-particle polypropylene.

The constituents of the polypropylene composition of the present invention, or the entire polypropylene composition, may be prepared by polymerizing propylene and at least one more non-propylene $C_2$-$C_{20}$-α-olefin in the presence of a suitable catalyst system and, optionally, hydrogen as a means to regulate molecular weight and/or to increase polymerization activity.

The polymerization is generally carried out at temperatures of from 20 to 150° C. and at pressures of from 1 to 100 bar, with average residence times of from 0.5 to 5 hours, preferably at temperatures of from 60 to 90° C. and at pressures of from 20 to 50 bar, with average residence times of from 0.5 to 3 hours. The polymerization can be carried out in one or more stages, in a known manner in bulk, in suspension or in the gas phase, in reactors usually used for polymerizing propylene. The polymerization can be carried out batchwise or, preferably, continuously.

For example, it is possible to polymerize two or more starting polymers separately, then to mix these by using suitable mixing equipment, such as screw extruders or diskpack plasticators, kneaders or roll mills. However, it is preferable for the propylene polymer compositions not to be polymerized separately. One preferred method is to carry out polymerization in the presence of a suitable catalyst in a series of different reactors, for example in a reactor cascade with at least two different reactors, with conditions in the reactors sufficiently different to give the final composition desired. Particularly preferred is a process that uses a reactor cascade of two reactors, wherein the polymerizations in both reactors are carried out in the gas phase.

EXAMPLES

Examples 1-25 given below illustrate the invention. Comparative Examples 26-35 are presented for comparison purposes and do not illustrate the invention.

The following experimental procedures were performed:
1. Polymerization:

A 5 liter stainless steel autoclave was employed for polymerization, equipped with a Micromotion MM-010 mass flow meter for filling liquid propylene at a maximum flow rate of 82000 g/h, a Brooks 5850-S flow meter for filling ethylene at a maximum flow rate of 20 sL/min, a Brooks Quantum mass flow meter for filling 1-butene at a maximum flow rate of 3000 g/h, a Brooks 5850-S flow meter for filling hydrogen at a maximum flow rate of 0.365 g/h and a blade stirrer coupled to a Dynamag MM-D60 PPI magnetic drive. The error ranges of the mass flow and flow meters are ±0.5%.

2. Blend Preparation:

All blends of Examples 7-15 and Comparative Examples 30 and 31 were prepared by dry mixing 700 g of a high melting autoclave component, 300 g of a low melting autoclave component, 0.5 g of primary antioxidant Irganox 1010®, 1 g of secondary antioxidant Irgafos 168® and 0.3 g of DHT 4A, an acid scavenging stabilizer. Strands of the respective mixtures were extruded and pelletized by using a single screw extruder at 230° C. melt temperature.

All blends of Comparative Examples 40-42 were prepared by dry mixing 7 g of a high melting autoclave component, 3 g of a low melting autoclave component, 0.005 g of primary antioxidant Irganox 1010®, 0.01 g of secondary antioxidant Irgafos 168® and 0.003 g of DHT 4A, an acid scavenging stabilizer. Strands of the respective mixtures were extruded and pelletized by using a Thermo Haake Rheomex CTW5 extruder in synchronous mode at 230° C. melt temperature.

3. Cast Film Production.

All films were produced using a melt temperature of 230° C. utilizing a single screw extruder with a 150 mm flat die and a 0.5 mm die gap. All films had a target thickness of 2 mil. Line speed was set at 3.25 m/min 4. Determination of Resin Properties a) C2 and C4 contents of the samples were determined by IR spectroscopy based on calibrations performed by $^{13}$C-NMR spectroscopy. The values reported are in % by weight.

b) The melting points and degrees of crystallinity of the samples were determined from DSC measurements. The typical mass of a sample was approximately 4 mg. The samples were heated from room temperature to 220° C. at a heating rate of 20° C./min and annealed at 220° C. for 5 min. Then they were cooled to −50° C. at a cooling rate of 20° C./min and annealed at −50° C. for 5 min. Then they were heated to 220° C. at a heating rate of 20° C./min. All data were evaluated from this second heating run.

c) The melt flow rates (MFR) of the samples were determined at a temperature of 230° C. and a load of 2.16 kg according to ASTM D 1238.

5. Determination of Xylene Solubles:

a) The following standard procedure was employed: a 250 mg sample were placed in a 40 ml septum capped vial with 25 ml xylene and a small stirrer bar. The vial was heated in a stirrer/heater block to 130° C. for one hour. After this time, all sample material was dissolved. Subsequently, the solution was cooled in air to 60° C. Then it was put in a water bath at 20° C. for 1 hour. After that, it was allowed to settle for another two 2 hours at 20° C. After this procedure, the xylene insolubles have precipitated from the solution whereas the xylene solubles ("XS") were still dissolved in the supernatant fluid. 100 μl of the supernatant fluid were analyzed by using the Viscotek FIPA (Flow Injection Polymer Analysis)/GPC (Gel Permeation Chromatography) technique. Weight percent xylene solubles are calculated relative to a standard polystyrene solution. The polystyrene standard solution was prepared by dissolving 10 mg of polystyrene of known molecular weight in 10 ml of THF. A single point calibration is used. Weight average molecular weight (Mw) and intrinsic viscosity (IV) were available through the use of a light scattering and viscosity detectors, respectively. The following specifications were used for running the device:

Detector: Model 301 TDA
Solvent: THF
Column: Viscogel FIPA-100H (10 cm*7.8 mm id)
Temperature: 50° C.
Injection Volume: 100 μl
Flow Rate: 1 mL/min The amount of xylene solubles determined according to this procedure are referred to as "$XS_{2h}$".

6. Determination of Xylene Solutes after Extended Settling Time of 5 Days was Accomplished by Performing the Following Procedure:

A sample was subjected to the same experimental recipe with the exception that the sample was allowed to settle for another 5 days instead of another 2 hours. The amount of xylene solubles determined according to this procedure are referred to as "$XS_{5d}$".

7. Temperature Rising Elution Fractionation (TREF):

The separation of the propylene polymer with respect to the crystallinity was carried out by Temperature rising elution fractionation (TREF). For this purpose, 5 g of each of the compositions were dissolved in 400 ml of boiling xylene and the solution was then cooled linearly to room temperature at a cooling rate of 10° C./h, the major part of the polymer being precipitated by crystallization.

The crystal suspension was transferred to a thermostat controlled 500 ml extraction apparatus, which corresponds to that described by [W. Holtrup in Makromol. Chem. 178, (1977) 2335], and was heated to the first elution temperature. The polypropylene crystals were extracted at this temperature for 20 minutes with vigorous mixing. Thereafter, the polymer solution was discharged while the polymer crystals remained behind in the extractor. The dissolved polymer was precipitated in cold acetone (temperature<0° C.) and the precipitate was filtered off and dried for 10 hours at 60° C. and 25 mbar vacuum.

After the discharging, the extractor was heated to the next elution temperature and 400 ml of xylene at the same temperature were added. Extraction was carried out once again for 20 minutes with vigorous mixing, the polymer solution was discharged, the dissolved polymer was precipitated in cold acetone and the precipitate was filtered off and dried as described before.

These steps were carried out at from 40° C. to 107° C. with the option to stop the fractionation program as soon as all polymer had dissolved. Then, the extractor was cleaned by extracting any possible polymeric residues at 135° C. for 30 minutes. In all cases, the completeness of the fractionation was illustrated by the fact that a maximum of 0.1 wt %, as recovered by precipitating the cleaning fraction and based on the total amount of the polymer subjected to the fractionation procedure, was found in this cleaning fraction. The sum of the polymer fractions recovered at temperature ranges from 40° C. to 50° C., 51° C. to 60° C., 61° C. to 92° C., and >92° C. were determined. The yield is the sum of all fractions, based on the total amount of polymer subjected to the fractionation procedure.

As the result of the combinations of the methods of the determination of the xylene solubles after extended settling time and the TREF, we report 5 fractions: "XS" (xylene solubles after extended settling time), fraction "50° C." (sum of all TREF fractions up to 50° C. minus XS), fraction "60° C." (sum of all TREF fractions from >50° C. to 60° C.), fraction "92° C." (sum of all fractions from >60° C. to 92° C.) and fraction ">92° C." (sum of all fractions from >92° C. to 107° C.).

8. The Determination of Film Properties was Performed in Accordance with 1% Secant Modulus (ASTM E111-97) Using a Sintech 1S Tester.

Secant modulus is typically related to the stiffness of a film. The test specimen consisted of a 1"×12" single ply film sample. The specimen was then loaded (in machine direction) into pneumatic grips (@80 psi) and run on tester. A distance of 10" separates the grips from each other. The crosshead moves at a rate 1 in/min and travels a total distance of 0.2".

9. Gloss Measurement Gloss20/Gloss45 (ASTM D-2457-90) [Gardner Gloss Meter & Micro-Gloss Meter].

Gloss20 and Gloss45 are optical tests performed on the outside surface of a 4"×4" film specimen. Specimens were tested on a black surface with a surface reflectance of less than 1 gloss unit. The "20" and "45" after the word "Gloss" refer to the angle at which the light source illuminates the film specimen. The device displays the amount of light that is reflected back to the light sensor on the other side of the device in gloss units. We used the Gardner gloss meter for 45-degree gloss and the Gardner micro-gloss to perform 20 degree gloss. 6 Specimens were run for each sample. Gloss is reported in units of gloss.

10. Determination of Haze Percent in Accordance with ASTM 1003-61 Using a Gardner Haze-Guard Plus Apparatus.

Film specimens were placed firmly against the specified port on the device and the light from the light source was passed through it to a sensor on the other side of the film. The sensor returns the haze percent values. The higher the number the more hazy the film sample is. Haze samples were 4"×4" in size. 6 Specimens were run per sample.

11. Determination of Seal Strength in Accordance with ASTM F88-99 using a Sencorp Systems Heat Sealer Model 12ASL/1.

Seal strength is a quantitative measure for use in process validation, process control and capability. The number of test specimens were chosen to permit an adequate determination of representative performance. Material was cut into strips in the machine direction and a seal was made across the strip and then pulled with the long tabs in the tester. This test-method measures the maximum force required to separate a test strip of material containing the seal. It also identifies the mode of specimen failure.

Sealed samples were prepared for testing by cutting to the following dimensions. Specimen width was 1.00 in. Specimen length was 3 to 4 in. The seal was tested at a rate of grip separation of 10 to 12 ipm. For each cycle, the maximum force encountered was reported as the specimen was stressed to failure and the mode of specimen failure was identified. The first temperature point of the curve is typically at about the seal initiation temperature. The end point of the heat-seal curve is when increasing temperature levels causes a break or tear of material at edge of seal commonly referred to as a fusion seal. Dwell time was 0.5 seconds. Sealing pressure most commonly used was 40 psi.

12. Determination of Hexane Extractables from Cast Films: the Hexane Extractables were determined according to FDA 177.1520 by subjecting 2 g of a respective film of 2 mil thickness an extraction procedure in an autoclave at 50° C. for 2 hours. After the extraction, the hexane was removed by evaporation and the dried residue was weighed.

Example 1

This example demonstrates the preparation of a metallocene olefin polymerization catalyst.

70 mg (0.091 mmol) rac-dimethylsilanediyl (2-methyl-4-(para-tert-butyl-phenyl)-indenyl)(2-isopropyl-4-(para-tert-butyl-phenyl)zirconiumdichloride were dissolved at room temperature in 4.3 cm$^3$ of a solution of methylaluminoxane in toluene (Albemarle Corporation, Baton Rouge, La., 4.75 M, 30 wt %). The solution was diluted with 3.7 cm$^3$ of toluene and stirred for 1 h at 25° C. without exposing it to light. The solution was added in portions to 4 g of $SiO_2$ (grade MS 948, W. R. Grace, Davison Chemical Division, Baltimore, Md., pore volume 1.6 ml/g, calcinated at 600° C.) while stirring. After addition, the solution was stirred for another 10 min. The ratio of solution volume to the total volume of the support material was 1.25. The batch was dried within 4 h at 40° C. and 10$^{-3}$ mbar. 5.5 g of a free flowing powder were obtained. According to elemental analysis the Zr content was 0.13 wt % and the Al content was 9.5 wt %.

Example 2

This example demonstrates the polymerization reaction to form copolymers for blending to form the polymer blend of the invention.

An autoclave was purged three times with nitrogen. The stirrer was adjusted to 175 rpm. At room temperature, 0.0003 g of hydrogen and 30 g of ethylene were added. As a scavenger, 15 cm$^3$ of a solution of triisobutylaluminum in n-heptane (25 wt %) were flushed into the autoclave with 1000 g of propylene and stirred for 1 min at 175 rpm. Then, 250 mg of the catalyst of Example 1 were flushed in with more propylene, yielding a total monomer feed (propylene and ethylene) to the reactor of 2000 g. Within 5 min, the temperature of the monomers mixture was brought to the polymerization temperature of 60° C. Polymerization was carried out for 30 min (run time). The polymerization was ceased by degassing. 900 g of polymer were obtained. The polymer was removed from the autoclave and dried overnight at room temperature and atmospheric pressure. The whole procedure was repeated 3 times until a total of 2.7 kg of polymer were produced.

Example 3-6

Example 2 was repeated with the exception that different amounts of hydrogen, ethylene and propylene were fed to the reactor. The exact reaction conditions are listed in Table 1.

TABLE 1

| Example # | $C_3$ feed [g] | $C_2$ feed [g] | $H_2$ feed [g] | Catalyst feed [mg] | Run temperature [° C.] | Run time [min] | Total number of runs | Total mass of polymer |
|---|---|---|---|---|---|---|---|---|
| 2 | 1970 | 30 | 0.0003 | 250 | 60 | 30 | 3 | 2700 |
| 3 | 1945 | 55 | 0.0005 | 200 | 60 | 30 | 4 | 2800 |
| 4 | 1925 | 75 | 0.0004 | 150–200 | 60 | 30 | 5 | 2100 |
| 5 | 1825 | 175 | 0.0175 | 35–70 | 60 | 15 | 7 | 1100 |
| 6 | 1770 | 230 | 0.04 | 35–110 | 60 | 15 | 6 | 900 |

The MFR of the resins of Examples 2 to 6 was determined from the powder as described above. The $C_2$ contents, melting points and xylene solubles of Examples 5 and 6 were determined from the powder. The results are listed in Table 2.

TABLE 2

| Example # | MFR [g/10 min] | $C_2$ content [wt %] | Tm [° C.] | $\Delta H_m$ [J/g] | $XS_{2h}$ [wt %] | $XS_{5d}$ [wt %] |
|---|---|---|---|---|---|---|
| 2 | 5.1 | | Determined from extruded pellets | | | |
| 3 | 5.7 | | | | | |
| 4 | 5.2 | | | | | |
| 5 | 3.7 | 8.6 | 100.1 | 54.3 | >90 | 23.4 |
| 6 | 4.2 | 9.6 | 87.6 | 45.3 | >90 | 75.7 |

Examples 7-15

Compounds of the produced resins of Examples 2 to 6 were prepared, extruded and pelletized. The resins of Examples 2, 3 and 4 represent the high melting point component used in the polymer blend of the invention. The resins of Examples 5 and 6 represent the relatively low melting point component used in the polymer blend of the invention. Examples 7, 8 and 9 are single polymer components and not polymer blends. Examples 10 to 15 include a relatively high melting point polymer component and a relatively low melting point polymer component and illustrate polymer blends according to the invention.

Example 7

1000 g of the resin of Example 2+0.5 g of Irganox 1010+1.0 g of Irgafos 168+0.3 g of DHT 4A.

Example 8

1000 g of the resin of Example 3+0.5 g of Irganox 1010+1.0 g of Irgafos 168+0.3 g of DHT 4A.

Example 9

700 g of the resin of Example 4+0.35 g of Irganox 1010+0.7 g of Irgafos 168+0.21 g of DHT 4A.

Example 10

700 g of the resin of Example 2+300 g of the resin of example 5+0.5 g of Irganox 1010+1.0 g of Irgafos 168+0.3 g of DHT 4A.

Example 11

700 g of the resin of Example 2+300 g of the resin of Example 6+0.5 g of Irganox 1010+1.0 g of Irgafos 168+0.3 g of DHT 4A.

Example 12

700 g of the resin of Example 3+300 g of the resin of example 5+0.5 g of Irganox 1010+1.0 g of Irgafos 168+0.3 g of DHT 4A.

Example 13

700 g of the resin of Example 3+300 g of the resin of example 6+0.5 g of Irganox 1010+1.0 g of Irgafos 168+0.3 g of DHT 4A.

Example 14

700 g of the resin of Example 4+300 g of the resin of example 5+0.5 g of Irganox 1010+1.0 g of Irgafos 168+0.3 g of DHT 4A.

Example 15

700 g of the resin of Example 4+300 g of the resin of example 6+0.5 g of Irganox 1010+1.0 g of Irgafos 168+0.3 g of DHT 4A.

The MFR, $C_2$ contents, melting points and xylene solubles of the resins of Examples 7 to 15 were determined from the pellets as described above. The results are listed in Table 3.

TABLE 3

| Example | MFR [g/10 min] | $C_2$ content [wt %] | Tm [° C.] | $\Delta H_m$ [J/g] | $XS_{2h}$ [wt %] | $XS_{5d}$ [wt %] | $XS_{2h}-XS_{5d}$ [wt %] | $\dfrac{(XS_{2h} - XS_{5d})}{XS_{2h}}$ | Mw of $SX_{5d}$ [kg/mol] | IV of $SX_{5d}$ [dl/g] |
|---|---|---|---|---|---|---|---|---|---|---|
| 7 | 3.4 | <1 | 144.1 | 97.9 | 0.2 | 0.2 | 0 | 0 | 31.7 | 0.30 |
| 8 | 4.4 | 2.1 | 133.3 | 85.0 | 0.3 | 0.3 | 0 | 0 | 64.1 | 0.41 |
| 9 | 3.5 | 2.7 | 128.3 | 80.5 | 0.5 | 0.4 | 0.1 | 0.2 | 68.3 | 0.51 |
| 10 | 3.5 | 2.6 | 140.5 | 83.9 | 16.3 | 13.9 | 2.3 | 0.14 | 352.0 | 2.35 |
| 11 | 3.5 | 3.1 | 141.1 | 82.1 | 19.0 | 14.7 | 4.3 | 0.23 | 342.3 | 2.39 |
| 12 | 3.9 | 3.8 | 130.0 | 73.1 | 17.2 | 3.6 | 13.6 | 0.79 | 409.2 | 2.48 |
| 13 | 4.0 | 4.5 | 130.0 | 69.1 | 20.5 | 14.9 | 5.6 | 0.27 | 330.1 | 2.22 |
| 14 | 3.2 | 4.6 | 124.8 | 70.2 | 15.2 | 4.3 | 10.9 | 0.72 | 329.0 | 2.23 |
| 15 | 3.4 | 5.0 | 125.4 | 70.0 | 21.3 | 3.9 | 17.4 | 0.82 | 348.6 | 2.27 |

The resins of Examples 5, 6, 7, 8, 9, 11, 14 and 15 were analyzed by TREF as described above. The results in terms of population of fractions can be read in Table 4.

TABLE 4

| Example | XS$_{5d}$ [wt %] | 50° C. [wt %] | 60° C. [wt %] | 92° C. [wt %] | >92° C. [wt %] | Yield [wt %] |
|---|---|---|---|---|---|---|
| 5 | 23.3 | 65.5 | 7.1 | 0.5 | 0 | 96.4 |
| 6 | 75.4 | 19.4 | 0.7 | 0 | 0 | 95.5 |
| 7 | 0.2 | 0.2 | 1.1 | 89.8 | 7.1 | 98.4 |
| 8 | 0.3 | 0.9 | 1.7 | 93.4 | 0 | 96.3 |
| 9 | 0.4 | 1.3 | 2.6 | 92.6 | 0 | 96.9 |
| 11 | 14.7 | 8.3 | 2.5 | 71.4 | 0 | 96.9 |
| 14 | 4.3 | 35.1 | 3.9 | 56.1 | 0 | 99.4 |
| 15 | 3.9 | 25.1 | 1.9 | 69.0 | 0 | 99.9 |

Examples 16-24

Films were made from the pellets of Examples 7-12 as described above. The following films were prepared:

Example 16

Film of Example 7.

Example 17

Film of Example 8.

Example 18

Film of Example 9.

Example 19

Film of Example 10.

Example 20

Film of Example 11.

Example 21

Film of Example 12.

Example 22

Film of Example 13.

Example 23

Film of Example 14.

Example 24

Film of Example 15.

The secant modulus, hexane extractables and seal initiation temperatures of the films of Examples 16 to 24 were determined as described above. The results are listed in Table 5.

TABLE 5

| Example | Secant modulus [MPa] | Hexane extractables [wt %] | SIT [° C.] |
|---|---|---|---|
| 16 | 740 | 0.2 | 121 |
| 17 | 560 | 0.3 | 110 |
| 18 | 510 | 0.3 | 110 |
| 19 | 470 | 0.5 | 116 |
| 20 | 460 | 0.9 | 116 |
| 21 | 420 | 0.8 | 110 |
| 22 | 380 | 1.4 | 110 |
| 23 | 410 | 1.0 | 99 |
| 24 | 340 | 2.5 | 93 |

The temperature dependent seal strength data of examples 16 to 24 are given in Table 6.

TABLE 6

Seal Strength (lb$_f$) as a function of temperature (° C.)

| Example | 88° C. | 93° C. | 99° C. | 105° C. | 110° C. | 116° C. | 121° C. | 127° C. | 132° C. | 137° C. |
|---|---|---|---|---|---|---|---|---|---|---|
| 16 | 0 | 0 | 0 | 0 | 0 | 0 | 0.8 | 1.6 | 6 | 7.8 |
| 17 | 0 | 0 | 0 | 0 | 0.2 | 1.7 | 6.1 | 5.6 | — | — |
| 18 | 0 | 0 | 0 | 0 | 1.1 | 5.1 | 5.2 | — | — | — |
| 19 | 0 | 0 | 0 | 0 | 0 | 0.9 | 1.1 | 3 | 6.1 | — |
| 20 | 0 | 0 | 0 | 0 | 0 | 0.6 | 1.2 | 2.6 | 6.6 | — |
| 21 | 0 | 0 | 0 | 0 | 1 | 1.8 | 5.4 | — | — | — |
| 22 | 0 | 0 | 0 | 0 | 0.5 | 1.5 | 4.7 | — | — | — |
| 23 | 0 | 0 | 0.4 | 0.7 | 1.4 | 6.7 | — | — | — | — |
| 24 | 0 | 0.3 | 0.5 | 0.6 | 0.9 | 6.7 | — | — | — | — |

Comparative Example 25

This Comparative Example demonstrates the preparation of a Ziegler-Natta catalyst.
Preparation of Ti-Containing Solid.

To a suspension of 57 kg of silica gel (Sylopol® 2229 by Grace Davison) in a mixture of 342 L ethylbenzene and 171 L heptane were added 542 L of a 20 wt % solution of n-butyl-n-octylmagnesium in heptane at ambient temperature. The reaction mixture was stirred at 95° C. for 30 min and subsequently cooled to 20° C., after which 55.5 kg of gaseous hydrogen chloride were introduced. After 120 min, the reaction product was admixed with 54.6 kg ethanol while stirring continuously. After 30 min of stirring, 536 kg of titaniumtetrachloride and 122 kg of dibutyl phthalate were added and stirred at 100° C. for 60 min. The solid thus obtained was filtered off and washed a number of times with ethylbenzene. The solid product obtained in this way was extracted for 180 min at 125° C. with a 10% strength by volume solution of titanium tetrachloride in ethylbenzene. The solid product was then separated from the extractant by filtration and washed with heptane until the washings contained only 0.3% by weight of titanium tetrachloride.

The titanium-containing solid component contained 4.2% by weight of Ti, 8.5% by weight of Mg, and 33.0% by weight of Cl.

Comparative Example 26

This example illustrates the polymerization of polymer components to prepare a blend not in accordance with the present invention.

The autoclave was purged three times with nitrogen. The stirrer was adjusted to 175 rpm. At room temperature, 0.3 g of hydrogen, 5 g of ethylene and 500 g of 1-butene were added. A mixture of 15 cm$^3$ of a solution of triethylaluminum in n-heptane (25 wt %) and of 5 cm$^3$ of a solution of bis-cyclopentyl dimethoxysilane (0.1 M in n-heptane) were flushed into the autoclave with 1000 g of propylene and stirred for 1 min at 175 rpm. Then, 30 mg of catalyst of Comparative Example 25 were flushed in with more propylene, yielding a total monomer feed (propylene+ethylene+1-butene) to the reactor of 2000 g. Within 5 minutes, the temperature of the monomers mixture was brought to the polymerization temperature of 75° C. Polymerization was carried out for 15 minutes. The polymerization was ceased by degassing. 470 Grams of polymer were obtained. The polymer was removed from the autoclave and dried overnight at room temperature and atmospheric pressure. The whole procedure was repeated 3 times until a total of 2.6 kg of polymer were produced.

Comparative Example 27

Comparative Example 26 was repeated with the exception that different amounts of hydrogen, ethylene, 1-butene and propylene were fed to the reactor and that polymerization was carried out at different temperatures. The exact reaction conditions are listed in Table 7. Any lumps that had formed during the polymerization process were destroyed by grinding the polymer batch in a mill using dry ice in order to keep the material brittle.

pressures of propylene to ethylene was 56:1, and the ratio of the partial pressures of 1-butene to ethylene was 5:1. Polymerization was carried out at a residence time of 1.5 hours with 2.2 g per hour of the catalyst of Comparative Example 25, 90 mmol per hour of triethylaluminum and 9 mmol per hour of isobutyl, isopropyldimethoxysilane being fed to the reactor. A propylene/ethylene-1-butene terpolymer was obtained with an MFR of 1 g/10 min. It was peroxidically degraded to an MFR of 5 g/10 min and pelletized. As stabilizers, 500 ppm of Irganox 1010, 1000 ppm of Irgafos 68 and 300 ppm of DHT 4A were added. Further analytical data are given in Table 8.

Comparative Example 29

A propylene/ethylene/1-butene was prepared in a cascade of two vertically stirred gas-phase reactors connected in series and having an effective volume of 200 l each, in the presence of hydrogen as a molecular weight regulator. Both reactors contained an agitated solid bed of finely divided polymer. Gaseous propylene, ethylene and 1-butene were polymerized continuously in the first reactor under a temperature of 80° C. and a pressure of 24 bar. The ratio of the partial pressures of propylene to ethylene was 60:1, and the ratio of the partial pressures of 1-butene to ethylene was 5:1. Polymerization was carried out at a residence time of 1.5 hours with 2.3 g per hour of the catalyst of Comparative Example 25, 90 mmol per hour of triethylaluminum and 9 mmol per hour of isobutyl, isopropyldimethoxysilane being fed to the reactor. The propylene/ethylene/1-butene terpolymer obtained after the end of the gas phase polymerization was then transferred, together with the still active catalyst components, to the second gas-phase reactor. There, gaseous propylene, ethylene and 1-butene were continuously copolymerized onto the terpolymer of the first step under a temperature of 80° C. and a pressure of 14 bar using isopropanol as a

TABLE 7

| Comp. Example # | C$_3$ Feed [g] | C$_2$ feed [g] | C$_4$ Feed [g] | H$_2$ feed [g] | Catalyst feed [mg] | Run temperature [° C.] | Run time [min] | Total Number of runs | Total mass of polymer |
|---|---|---|---|---|---|---|---|---|---|
| 26 | 1495 | 5 | 500 | 0.4 | 30 | 65 | 15 | 3 | 2360 |
| 27 | 1560 | 40 | 400 | 0.72 | 30 | 40 | 15 | 5 | 610 |

Comparative Example 28

In a vertically stirred gas-phase reactor of an effective volume of 200 l, a propylene/ethylene/1-butene terpolymer was produced in the presence of hydrogen as a molecular weight regulator. The reactor contained an agitated bed of finely divided polymer. Gaseous propylene, ethylene and 1-butene were polymerized continuously under a temperature of 70° C. and a pressure of 20 bar. The ratio of the partial regulator. The ratio of the partial pressures of propylene to ethylene was 34:1, and the ratio of the partial pressures of 1-butene to ethylene was 3:1. A propylene/ethylene-1-butene terpolymer was obtained with an MFR of 1 g/10 min. It was peroxidically degraded to an MFR of 5 g/10 min and pelletized. As stabilizers, 500 ppm of Irganox 1010, 1000 ppm of Irgafos 68 and 300 ppm of DHT 4A were added. Further analytical data are given in Table 8.

TABLE 8

| Comp. Example # | MFR [g/10 min] | C$_2$ content [wt %] | C$_4$ content [wt %] | Tm [° C.] | XS$_{2h}$ [wt %] | XS$_{5d}$ [wt %] | Mw of XS$_{5d}$ [kg/mol] | IV of XS5d [dl/g] |
|---|---|---|---|---|---|---|---|---|
| 26 | 4.2 | 1.1 | 8.0 | 134.0 | 3.2 | n.d. | n.d. | n.d. |
| 27 | 5.9 | 4.6 | 9.1 | 116.0 | 38.9 | n.d. | n.d. | n.d. |
| 28 | 5.0 | 2.2 | 7.7 | 129.7 | 5.4 | 5.3 | 98.2 | 0.85 |
| 29 | 5.0 | 2.2 | 7.4 | 130.8 | 8.8 | 8.6 | n.d. | n.d. |

Comparative Examples 30 to 31

Compounds of the produced resins of Comparative Examples 26 to 27 were prepared, extruded and pelletized.

Comparative Example 30

1000 g of the resin of Comparative Example 26+0.5 g of Irganox 1010+1.0 g of Irgafos 168+0.3 g of DHT 4A.

Comparative Example 31

700 g of the resin of Comparative Example 26+300 g of Comparative Example 27+0.5 g of Irganox 1010+1.0 g of Irgafos 168+0.3 g of DHT 4A.

Comparative Example 31 had a MFR of 4.7 g/10 min, a melting point of 133.0° C., an $XS_{2h}$ of 13.9 wt % and a $XS_{5d}$ of 10.2 wt %. The Mw of $X_{5d}$ was 83.6 kg/mol and the IV was 0.74 dl/g.

The resins of Comparative Examples 28, 29 and 31 were analyzed by TREF as described above. The results in terms of population of fractions are set forth in Table 9.

TABLE 9

| Comparative Example # | $XS_{5d}$ [wt %] | 50° C. [wt %] | 60° C. [wt %] | 92° C. [wt %] | >92° C. [wt %] | Yield [wt %] |
|---|---|---|---|---|---|---|
| 28 | 5.3 | 15.9 | 13.6 | 62.9 | 0 | 97.7 |
| 29 | 8.6 | 15.9 | 12.6 | 59.9 | 0 | 97.0 |
| 31 | 10.2 | 21.5 | 5.1 | 58.8 | 0.4 | 96.0 |

Comparative Examples 32 to 35

Films were made from the pellets of Comparative Examples 28 to 31 as described above. The following films were prepared:

Comparative Example 32

Film of the resin of Comparative Example 28.

Comparative Example 33

Film of the resin of Comparative Example 29.

Comparative Example 34

Film of the resin of Comparative Example 30.

Comparative Example 35

Film of the resin of Comparative Example 31.

The secant modulus, hexane extractables and seal initiation temperatures of the films of Comparative Examples 32 to 35 were determined as described above. The results are listed in Table 10.

TABLE 10

| Example # | Secant modulus [MPa] | Hexane extractables [wt %] | SIT [° C.] |
|---|---|---|---|
| 32 | 420 | 2.5 | 105 |
| 33 | 420 | 3.2 | 105 |
| 34 | 440 | n.d. | 121 |
| 35 | 390 | 4.4 | 104 |

The temperature dependent seal strength data of examples 32 to 35 are given in Table 11 and Table 12.

TABLE 11

| | Seal Strength ($lb_f$) as a function of temperature (° C.) | | |
|---|---|---|---|
| Example | 100° C. | 105° C. | 110° C. |
| 32 | 0 | 0.7 | 2.7 |
| 33 | 0 | 0.5 | 2.5 |

TABLE 12

| | Seal Strength ($lb_f$) as a function of temperature (° C.) | | | | | | | | | | | |
|---|---|---|---|---|---|---|---|---|---|---|---|---|
| Example | 101° C. | 104° C. | 105° C. | 107° C. | 110° C. | 113° C. | 116° C. | 118° C. | 121° C. | 124° C. | 127° C. | 129° C. |
| 34 | 0 | 0 | 0 | 0 | 0 | 0 | 0 | 0 | 1.1 | 2.1 | 2.8 | 4.7 |
| 35 | 0 | 0.7 | 0.6 | 1.7 | — | — | — | — | — | — | — | — |

Comparative Example 36

Example 1 was repeated with the exception that instead of the metallocene rac-dimethylsilanediyl (2-methyl-4-(para-tert-butyl-phenyl)-indenyl)(2-isopropyl-4-(para-tert-butyl-phenyl)zirconiumdichloride, the metallocene rac-dimethyl-silanediylbis(2-methyl-indenyl)zirconiumdichloride was used. 5.3 g of a freeflowing powder were obtained.

Comparative Examples 37-39

Example 2 was repeated, with the exception that instead of the catalyst prepared in Example 1, the catalyst prepared in Comparative Example 36 was used. No hydrogen was used in any of the polymerizations, and the amount of propylene and ethylene fed to the reactor were different. The exact reaction conditions are listed in Table 13.

| Comp. Example # | $C_3$ feed [g] | $C_2$ feed [g] | $H_2$ feed [g] | Catalyst feed [mg] | Run temperature [° C.] | Run time [min] | Total number of runs | Total mass of polymer |
|---|---|---|---|---|---|---|---|---|
| 37 | 1990 | 10 | — | 125 | 60 | 15 | 1 | 90 |
| 38 | 1965 | 35 | — | 125 | 20 | 60 | 1 | 37 |
| 39 | 1965 | 35 | — | 150 | 20 | 60 | 1 | 36 |

The melt flow rates, $C_2$ contents, melting points and xylene solubles of the resins of Comparative Examples 37 to 39 were determined from the powder as described above. The results are listed in Table 14.

TABLE 14

| Comp. Example # | MFR [g/10 min] | $C_2$ content [wt %] | Tm [° C.] | $XS_{2h}$ [wt %] | $XS_{5d}$ [wt %] |
|---|---|---|---|---|---|
| 37 | 55 | 1.7 | 128.7 | 0.9 | 0.8 |
| 38 | 220 | 11.7 | 102.4 | 66.8 | 57.2 |
| 39 | 230 | 12.3 | 97.6 | 73.3 | 64.8 |

Comparative Examples 40-42

Compounds of the produced resins of Comparative Examples 37 to 39 were prepared, extruded and pelletized. The resin of Comparative Example 37 represents the high melting point component. The resins of Comparative Examples 38 and 39 represent the relatively low melting point components. Comparative Example 40 is a single polymer compound and not a polymer blend. Comparative Examples 41 and 42 include a relatively high melting point polymer component and a relatively low melting point polymer component and illustrate metallocene catalyzed polymer blends known in the art.

Comparative Example 40

10 g of the resin of Comparative Example 37+0.005 g of Irganox 1010+0.01 g of Irgafos 168+0.003 g of DHT 4A.

Comparative Example 41

7 g of the resin of Comparative Example 37+3 g of the resin of Comparative Example 38+0.005 g of Irganox 1010+0.01 g of Irgafos 168+0.003 g of DHT 4A.

Comparative Example 42

7 g of the resin of Comparative Example 37+3 g of the resin of Comparative Example 39+0.005 g of Irganox 1010+0.01 g of Irgafos 168+0.003 g of DHT 4A.

The MFR, $C_2$ contents, melting points and xylene solubles of the resins of Examples 7 to 15 were determined from the pellets as described above. The results are listed in Table 15.

Referring now to Example 10-15 of Table 3, it can be seen that the xylene soluble fraction of the resin blends of the invention are characterized by a molecular weight of well over 300 kg/mol and an intrinsic viscosity (IV) of over 2.00 dl/g.

Referring to Table 5, the amount of hexane extractables from the films of Examples 19-24, made respectively from the resin blends of Examples 10-15, range from 0.5 to 2.5 wt %. The corresponding seal initiation temperatures were no higher than 116° C. and for Examples 23 and 24, were below 100° C.

In contrast, the polymer blend of Comparative Example 31, the xylene solubles had a molecular weight of only 83.6 kg/mol and an IV of 0.74 dl/g. The hexane extractables from the film of Comparative Example 35 (made from the polymer blend of Comparative Example 31) was 4.4 wt % and the film had an SIT value of 104° C. (Table 10).

Also in contrast, the polymer blends of Comparative Examples 41 and 42, the xylene solubles had molecular weights of only 65.0 kg/mol and 77.7 kg/mol, respectively, and IV values of 0.71 dl/g and 0.81 dl/g, respectively. It can be seen that the present invention provides a polymer material having a more advantageous balance of properties.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A composition comprising a polymer blend of:
   a) a first random copolymer of propylene and at least one non-propylene $C_2$-$C_{20}$ α-olefin, said first random copolymer having a propylene content of above 90 up to about 99.5 weight percent, a melting point of above 116° C. to about 145° C. and which constitutes from about 60 weight percent to about 95 weight percent of the composition, and
   b) a second random copolymer of propylene and at least one non-propylene $C_2$-$C_{20}$ α-olefin, said second random copolymer having a propylene content of above 85 up to about 97 weight percent, but less than the propylene content of the first random copolymer, a melting point from about 70° C. to no more than 116° C. and which constitutes from about 5 weight percent to about 40 weight percent of the composition,

TABLE 15

| Comp. Example | $C_2$ content [wt %] | Tm [° C.] | $XS_{2h}$ [wt %] | $XS_{5d}$ [wt %] | $XS_{2h}$-$XS_{5d}$ [wt %] | $\dfrac{(XS_{2h} - XS_{5d})}{XS_{2h}}$ | Mw of $XS_{5d}$ [kg/mol] | IV of $XS_{5d}$ [dl/g] |
|---|---|---|---|---|---|---|---|---|
| 40 | 1.7 | 128.7 | 0.2 | 0.2 | 0 | 0 | 31.7 | 0.30 |
| 41 | 4.9 | 130.3 | 15.2 | 12.2 | 3.0 | 0.20 | 65.0 | 0.71 |
| 42 | 5.1 | 129.9 | 19.9 | 16.5 | 3.4 | 0.17 | 77.7 | 0.81 | wherein said polymer blend includes a fraction soluble in xylene at 20° C., determined at 20° C. and 5 days settling time, the xylene soluble fraction having a weight average molecular weight of more than 100 kg/mol and an intrinsic viscosity of above about 1.0 dl/g.

2. The composition of claim 1 wherein said xylene soluble fraction has a weight average molecular weight of above about 150 kg/mol.

3. The composition of claim 1 wherein said xylene soluble fraction has a weight average molecular weight of above about 200 kg/mol.

4. The composition of claim 1 wherein said xylene soluble fraction has a weight average molecular weight of above about 300 kg/mol.

5. The composition of claim 1 wherein said xylene soluble fraction has an intrinsic viscosity of above about 1.3 dl/g.

6. The composition of claim 1 wherein said xylene soluble fraction has an intrinsic viscosity of above about 1.6 dl/g.

7. The composition of claim 1 wherein said xylene soluble fraction has an intrinsic viscosity of above about 2.0 dl/g.

8. The composition of claim 1, wherein the polymer blend includes from 3 to 30 weight percent of ultra low crystallinity fractions, said ultra low crystallinity fractions being defined as the difference between the amount of xylene soluble components as determined at 20° C. and 2 hours settling time and the amount of xylene soluble components as determined at 20° C. and 5 days settling time.

9. The composition of claim 1 having a melt flow rate at 230° C. and 2.16 kg of above 2 to about 15 g/10 min.

10. The composition of claim 1, wherein both random copolymers of the polymer blend were prepared by means of a metallocene catalyst.

11. A film having at least one layer fabricated from the composition of claim 1.

12. The film of claim 11, wherein the amount of hexane extractable fraction of the film layer comprises no more than about 3.0 weight percent.

13. A composition comprising a polymer blend of:
 a) a first random copolymer of propylene and ethylene, said first random copolymer having a propylene content of above 90 up to about 99.5 weight percent and a melting point of above 116° C. to about 145° C., and which constitutes from about 60 weight percent to about 95 weight percent of the composition, and
 b) a second random copolymer of propylene and ethylene, said second random copolymer having a propylene content of above 85 up to about 97 weight percent, but less than the propylene content of the first random copolymer, a melting point from about 70° C. to no more than 116° C., and which constitutes from about 5 weight percent to about 40 weight percent of the composition,
 wherein said polymer blend includes a fraction soluble in xylene at 20° C., determined at 20° C. and 5 days settling time, the xylene soluble fraction having a weight average molecular weight of more than 100 kg/mol and an intrinsic viscosity of above about 1.0 dl/g.

14. The composition of claim 13 wherein said xylene soluble fraction has a weight average molecular weight of above about 150 kg/mol.

15. The composition of claim 13 wherein said xylene soluble fraction has a weight average molecular weight of above about 200 kg/mol.

16. The composition of claim 13 wherein said xylene soluble fraction has a weight average molecular weight of above about 300 kg/mol.

17. The composition of claim 13 wherein said xylene soluble fraction has an intrinsic viscosity of above about 1.3 dl/g.

18. The composition of claim 13 wherein said xylene soluble fraction has an intrinsic viscosity of above about 1.6 dl/g.

19. The composition of claim 13 wherein said xylene soluble fraction has an intrinsic viscosity of above about 2.0 dl/g.

20. The composition of claim 13, wherein the polymer blend includes from 3 to 30 weight percent of ultra low crystallinity fractions, said ultra low crystallinity fractions being defined as the difference between the amount of xylene soluble components as determined at 20° C. and 2 hours settling time and the amount of xylene soluble components as determined at 20° C. and 5 days settling time.

21. The composition of claim 13, having a melt flow rate at 230° C. and 2.16 kg of between 2 and about 15 g/10 min.

22. The composition of claim 13, wherein both random copolymers of the polymer blend were prepared by means of a metallocene catalyst.

23. A film having at least one layer fabricated from the composition of claim 13.

24. The film of claim 23, wherein the amount of hexane extractable fraction of the film layer comprises no more than about 3.0 weight percent.

25. A process for preparing a polypropylene copolymer composition comprising:
 a) providing a catalyst comprising a metallocene compound having the formula $$R^9L^1L^2M^1R^1R^2 \qquad \text{(Formula I)}$$

wherein $M^1$ is a metal of Group IVb of the Periodic Table of the Elements, $L^1$ and $L^2$ are identical or different and are each a substituted mononuclear or polynuclear hydrocarbon radical or (a) hetero atom(s) containing hydrocarbon radical(s), which form a sandwich structure with the central atom $M^1$, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, or $R^1$ and $R^2$ together can form one or more ring system(s), $R^9$ is a bridge between the ligands $L^1$ and $L^2$ selected from the groups -continued

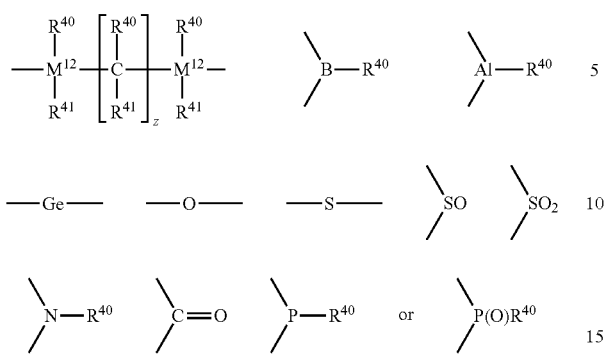

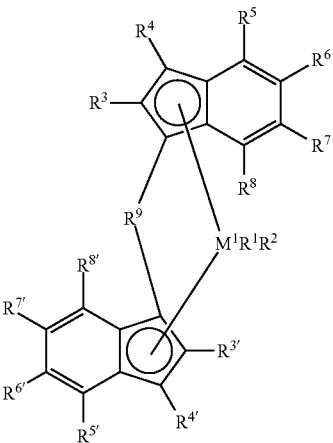
(Formula II)

wherein R$^{40}$, R$^{41}$ can be identical or different, even when they have the same index, and are each a hydrogen atom, a halogen atom or a C$_1$-C$_{40}$ group such as a C$_1$-C$_{20}$-alkyl group, a C$_1$-C$_{10}$-fluoroalkyl group, a C$_1$-C$_{10}$-alkoxy group, a C$_6$-C$_{14}$-aryl group, a C$_6$-C$_{10}$-fluoroaryl group, a C$_6$-C$_{10}$-aryloxy group, a C$_2$-C$_{10}$-alkenyl group, a C$_7$-C$_{40}$-arylalkyl group, a C$_7$-C$_{40}$-alkylaryl group or a C$_8$-C$_{40}$-arylalkenyl group, where R$^{40}$ and R$^{41}$ may each, together with the atoms connecting them, form one or more rings, and z is an integer from zero to M$^{12}$ is silicon, germanium or tin, and R$^9$ may also link two units of the formula II to one another;

b) providing a first monomer mixture of propylene and at least one C$_2$-C$_{20}$ nonpropylene α-olefin in amounts such that the copolymer produced therefrom has a ratio of between 90 and about 99.5 wt % propylene units to between about 0.5 wt % and 10 wt % of the non-propylene α-olefin units;

c) polymerizing the first monomer mixture in the presence of the metallocene catalyst under polymerization reaction conditions to form a first random copolymer having a melting point between 116° C. and 145° C.;

d) providing a second monomer mixture of propylene and at least one C$_2$-C$_{20}$ nonpropylene α-olefin in amounts such that the copolymer produced therefrom has a ratio of between 85 and about 97 wt % propylene units to between about 3 wt % and 15 wt % of the non-propylene α-olefin;

e) polymerizing the second monomer mixture in the presence of the metallocene catalyst under polymerization reaction conditions to form a second random copolymer having a melting point between 70° C. and 116° C.; and f) blending the first random copolymer and the second random copolymer to provide a polypropylene copolymer composition including about 60 wt % to about 95 wt % of the first random copolymer and from about 5 wt % to about 40 wt % of the second random copolymer based upon total composition weight wherein said polymer blend includes a fraction soluble in xylene at 20° C., determined at 20° C. and 5 days settling time, the xylene soluble fraction having a weight average molecular weight of more than 100 kg/mol and an intrinsic viscosity of above about 1.0 dl/g.

26. The process of claim 25 where the catalyst comprises a metallocene compound having the formula wherein M$^1$ is zirconium or hafnium R$^1$, R$^2$, and the bridging unit R$^9$ have the meaning set forth above with respect to formula I;

R$^4$, R$^5$, R$^6$, R$^7$, R$^8$ and also R$^{4'}$, R$^{5'}$, R$^{6'}$, R$^{7'}$ and R$^{8'}$ are identical or different and are each a hydrogen atom, a linear, cyclic or branched hydrocarbon group, with or without heteroatoms, selected from an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl or arylsilyl group and/or two adjacent radicals R$^5$, R$^6$ or R$^{5'}$, R$^{6'}$, or R$^6$, R$^7$ or R$^{6'}$, R$^{7'}$, or R$^7$, R$^8$ or R$^{7'}$, R$^{8'}$ in each case may form a hydrocarbon ring system or R$^5$ and R$^{5'}$ are identical or different and are each a substituted or unsubstituted aryl group of from 6 to about 40 carbon atoms.

27. The process of claim 25, wherein the polymerizing steps (c) and (e) are performed using a reactor cascade composed of at least two reactors in series.

28. The process of to claim 27, wherein the polymerization is carried out in gas phase.

29. The process of claim 25 using hydrogen in polymerization steps (c) and/or (e) as a molecular weight regulator.

30. The process of claim 25 wherein the metallocene compound is selected from the group consisting of dimethylsilandiyl(2-methyl-4-(para-tert-butyl-phenyl)-indenyl)(2-isopropy-1-4-(para-tert-butyl-phenyl)-indenyl)zirconiumdichloride, dimethylsilandiyl(2-ethyl-4-(4'-tert.butyl-phenyl)-indenyl)(2-isopropyl-4-1-(4'-tert.-butyl-phenyl)-indenyl)zirconiumdichloride, dimethylsilandiyl(2-methyl-4-(4'-tert.butyl-phenyl)-indenyl)(2-isopropyl-4-phenyl-indenyl)zirconiumdichloride, dimethylsilandiyl(2-methyl-4-phenyl)-1-indenyl)(2-isopropyl-4-(4'-tert.-b-utyl-phenyl)-1-indenyl)zirconiumdichloride, dimethylsilandiyl(2-ethyl-4-(4'-tert.butyl-phenyl)-indenyl)(2-isopropyl-4-1-phenyl)-indenyl)zirconiumdichloride, dimethylsilandiyl(2-isopropyl-4-(4'-tert.butyl-phenyl)-indenyl)(2-methyl-4,5-benzo-indenyl)zirconiumdichloride, dimethylsilandiyl(2-methyl-4-(4'-tert.butyl-phenyl)-indenyl)(2-isopropyl-4-(1-naphthyl)-indenyl)zirconiumdichloride and dimethylsilandiyl(2-isopropyl-4-(4'-tert.butyl-phenyl)-indenyl)(2-methyl-4-1-(1-naphthyl)-indenyl)zirconiumdichloride.

\* \* \* \* \*